United States Patent [19]

Binder

[11] Patent Number: 4,496,848
[45] Date of Patent: Jan. 29, 1985

[54] DEVICE FOR HARNESSING WIND ENERGY INCLUDING SHOCK ABSORBER

[76] Inventor: Adam Binder, 52, Rue de la Tour d'Auvergne, 75009 Paris, France

[21] Appl. No.: 456,052

[22] PCT Filed: May 7, 1982

[86] PCT No.: PCT/FR82/00081
§ 371 Date: Jan. 5, 1983
§ 102(e) Date: Jan. 5, 1983

[87] PCT Pub. No.: WO82/03893
PCT Pub. Date: Nov. 11, 1982

[30] Foreign Application Priority Data

May 8, 1981 [FR] France .................. 81 09183

[51] Int. Cl.³ ............... F01D 5/14; F04D 29/38
[52] U.S. Cl. ................. 290/55; 416/169 R; 416/197 A
[58] Field of Search ........ 290/44, 55; 267/58, 267/137, 155, 157; 74/607; 416/197 A, 43, 169 R

[56] References Cited

U.S. PATENT DOCUMENTS

| 1,987,316 | 1/1935 | Zimmer | 267/155 |
|---|---|---|---|
| 3,743,848 | 7/1973 | Strickland | 290/44 |
| 4,047,833 | 9/1977 | Decker | 416/197 A |
| 4,134,708 | 1/1979 | Brauser et al. | 290/55 |
| 4,260,325 | 4/1981 | Cymara | 416/197 A |

Primary Examiner—J. V. Truhe
Assistant Examiner—Shelley Wade
Attorney, Agent, or Firm—Darby & Darby

[57] ABSTRACT

A wind energy collecting device comprise a vertical rotor and blade of which the face exposed to the wind includes cells for engulfing air currents. The blades drive a uses device through unique shock absorber means.

3 Claims, 7 Drawing Figures

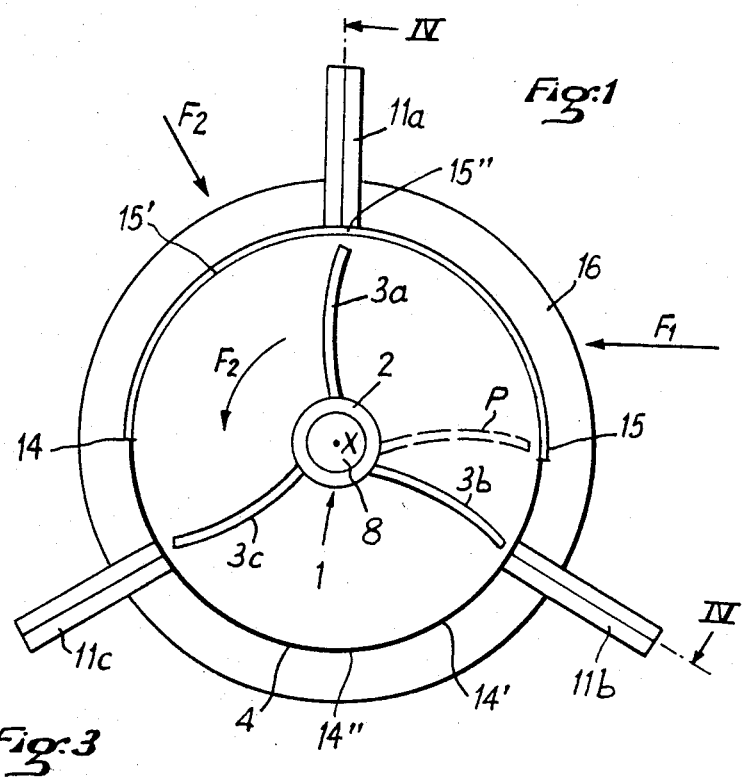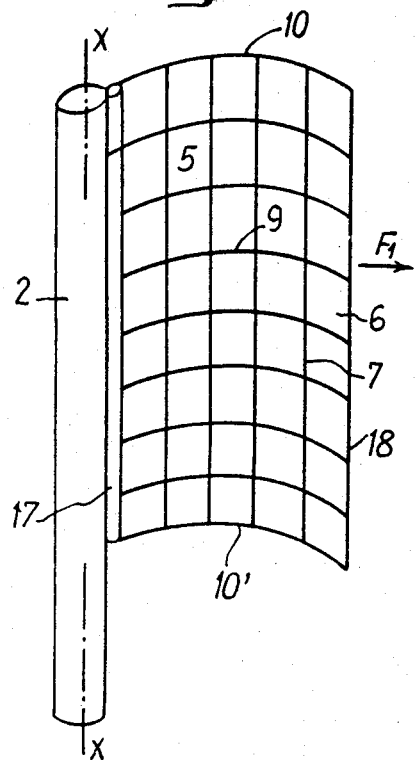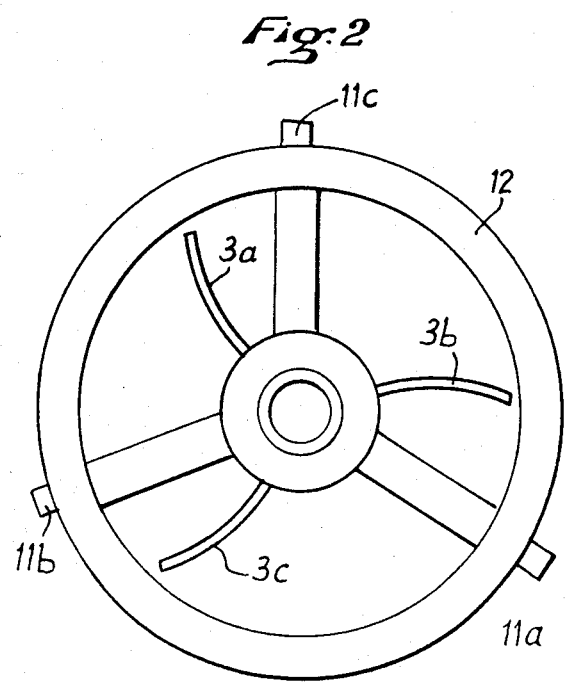

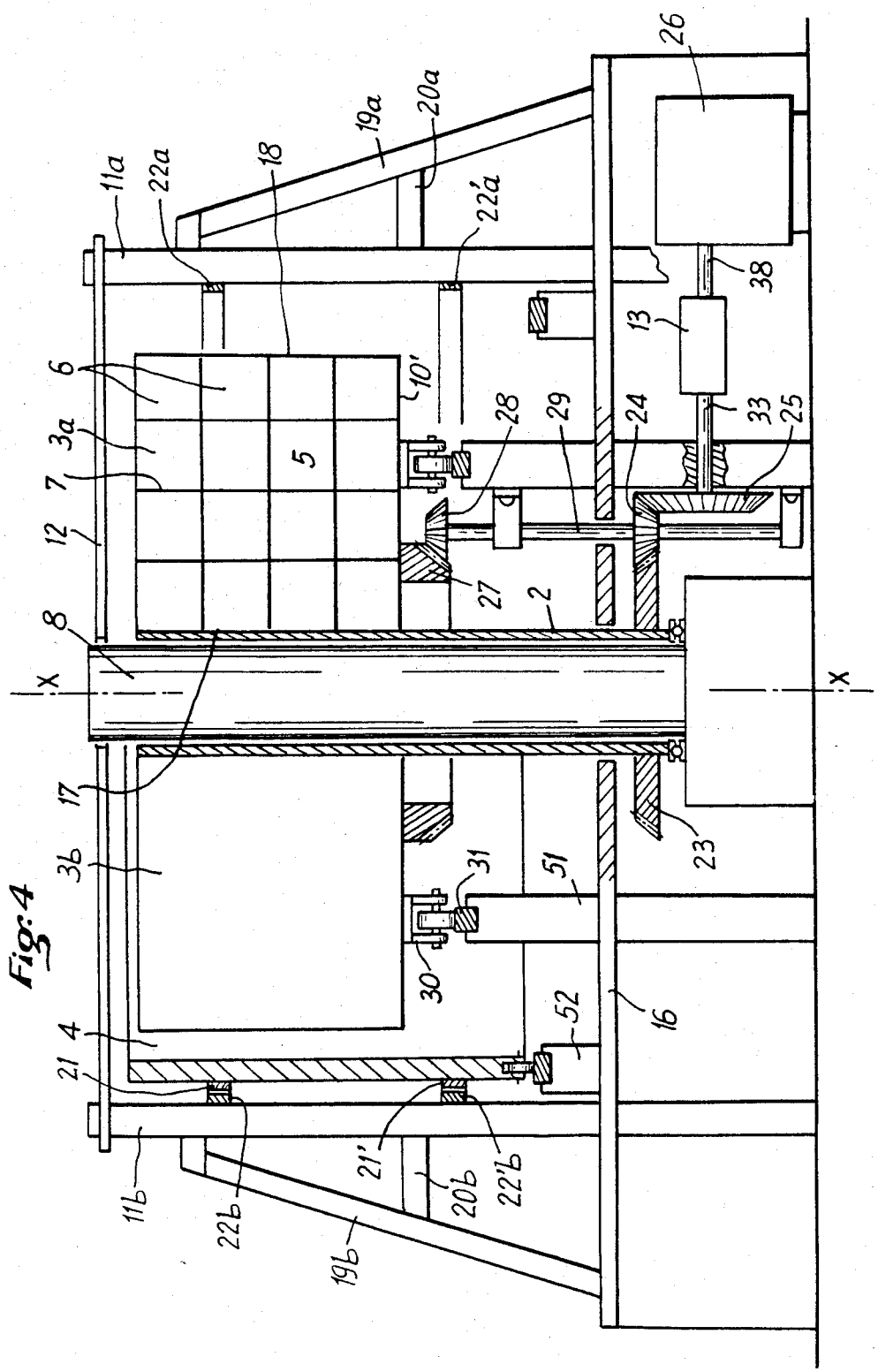

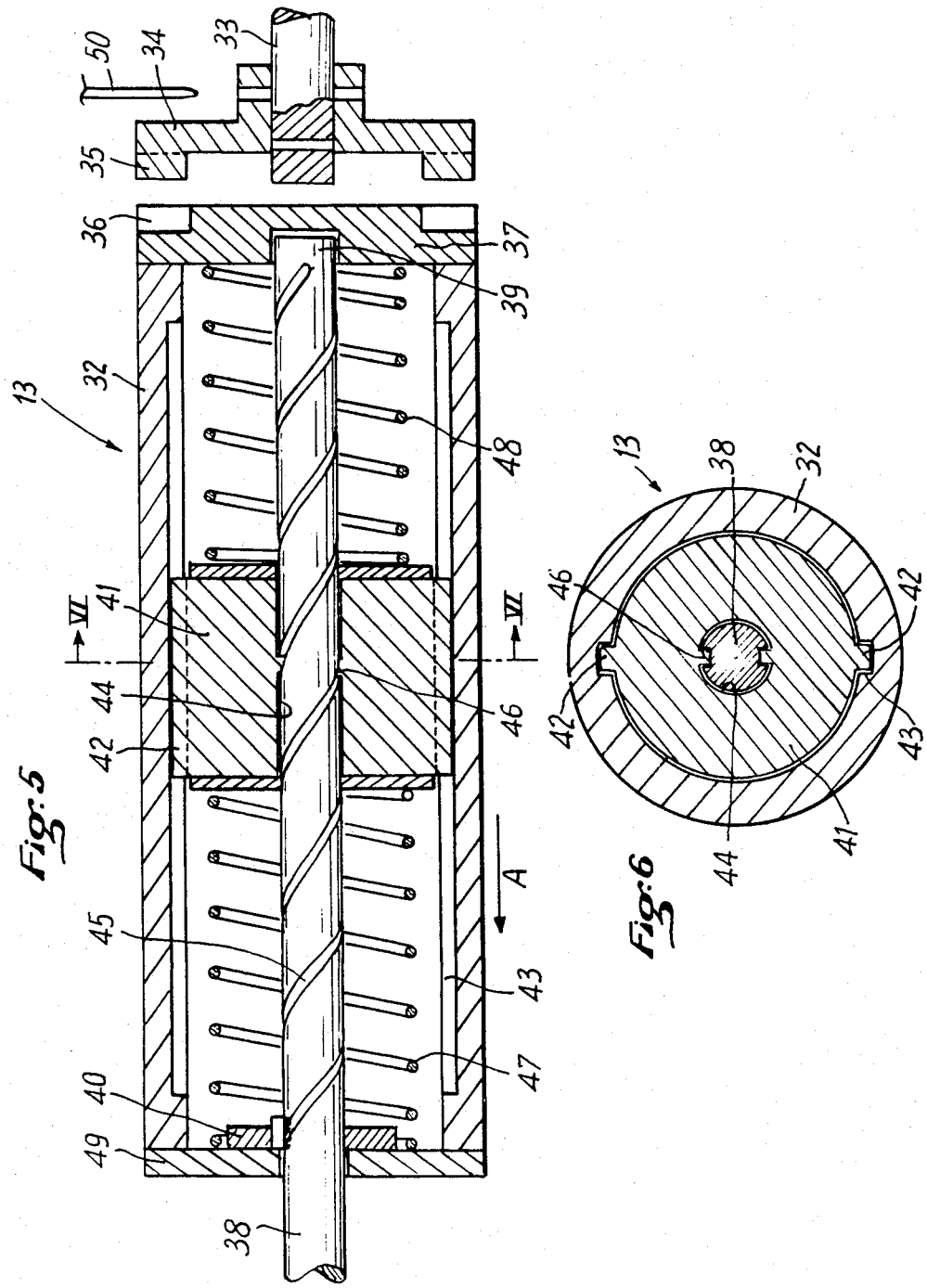

DEVICE FOR HARNESSING WIND ENERGY INCLUDING SHOCK ABSORBER

The invention concerns a device for harnessing wind energy.

Devices are known that make it possible to harness wind energy and that include, in particular, several generators connected together. The movements of these generators are made mutually dependent by an appropriate transmission (See French Pat. No. 1,194,781).

Other devices are known, such as the one described in French Pat. No. 2,291,380, which includes a motor using wind energy with the help of a vertical shaft, serving as a support for several rotors with a vertical axis, arranged in regular fashion around the shaft. However, such a device is not designed to connect the generators so as to concentrate their efforts with respect to the wind. Moreover, the design does not call for the orientation of the generators with respect to the direction of the wind, and, in addition, the generators are not protected from gusts of wind.

A device for harnessing wind energy has been described in French Pat. No. 77,14664 of the applicant and includes a central generator and a set of satellite generators, each generator being equipped with a rotor with blades, some means of orienting air currents inside the set of generators, and some means of concentrating the rotational thrust of the rotors of satellite generators, which allows still better harnessing of energy. However, such a device, although providing very satisfying results, is complex in its structure.

The present invention aims at reducing these drawbacks. One purpose of the invention is to harness wind energy by means of a device with a simple structure, easy to build, and economical.

Another purpose of the present invention is to provide a device of this type that stands up very well to wind and that, in addition, makes it possible to absorb sudden gusts of wind in order to protect the parts downwind of the harnessing device.

To achieve these aims, the invention proposes a device for harnessing wind energy that includes a central generator made up of a rotor and of at least two blades elongated axially in the vertical position, the blades being oriented radially, in a horizontal plane, and includes means of protecting the blades not subjected to the wind and means of supporting the generator, the device being such that the blades include means of harnessing kinetic energy. These means are cells called for by the design on the active surface area of the blades. The blades are solid as in known devices, but, on the other hand, they have cells on the surface subjected to the force of the wind, which catch the wind. Thus, the wind does not slide over this surface, but, on the contrary, rushes into the cells, which makes it possible to increase the amount of energy harnessed. Moreover, the blades are masked by means that are mobile in rotation around the rotor and that are placed in such a way that the blades advancing in the direction opposite to that of the wind are protected from it and that their movement is therefore not slowed down.

The following description, in the light of the drawings appended as a nonrestrictive example, will make it possible to understand better how the present invention can be implemented.

FIG. 1 is a horizontal sectional view of the device according to the present invention;

FIG. 2 is an overhead view of the device;

FIG. 3 is a view of a blade;

FIG. 4 is a view of the device according to the invention, and sectional according to line IV—IV of FIG. 1;

FIG. 5 is a view of a shock absorber making it possible to compensate for gusts of wind on the device according to the invention;

FIG. 6 is a sectional view according to line VI—VI of FIG. 5;

Figure 7:
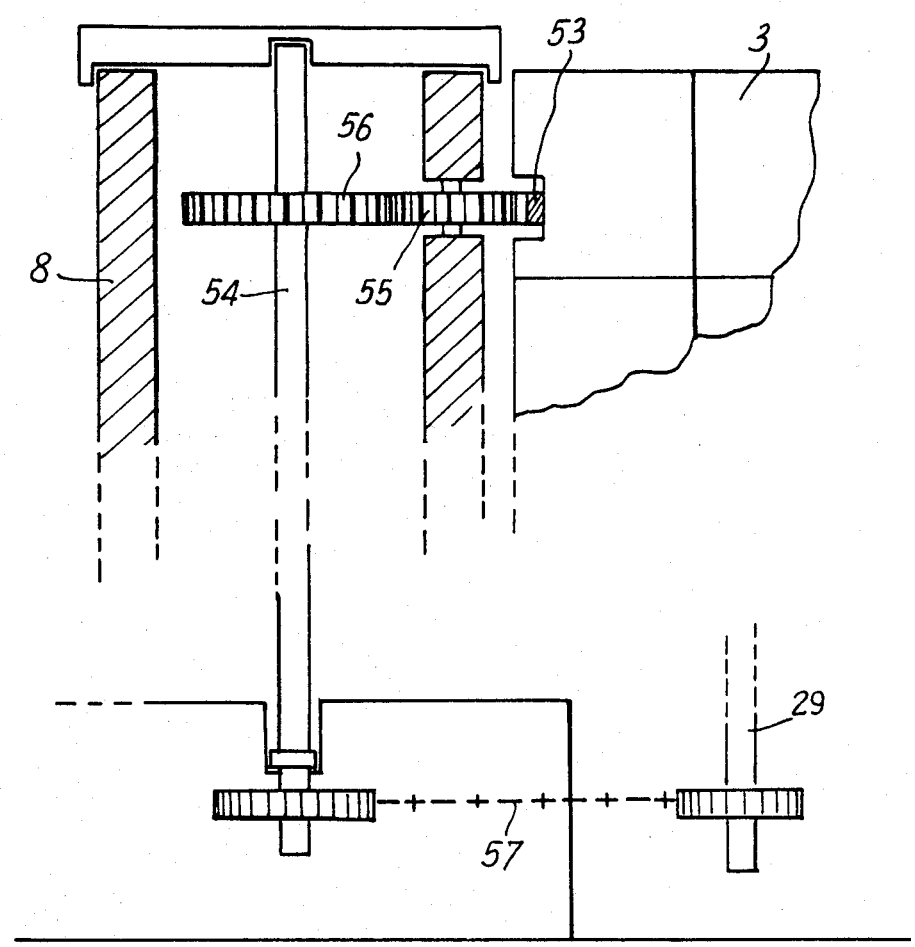
FIG. 7 is a schematic view of a transmission.

The device for harnessing wind energy according to the invention includes a central generator 1 made up of a rotor 2 and blades 3. These blades are at least two in number. They are elongated axially in the vertical position. They are oriented radially in a horizontal plane. A means of protection makes it possible to protect the blades that are not carried along according to the direction of the wind. The blades have an active surface area that is not smooth, i.e., surface 5 subjected to the action of the wind includes cells 6 into which the air currents flow. The cells are adapted to the dimension of the blades, which is not defined. These cells are formed (FIG. 3) by at least one series of very nearly parallel ridges. An initial series 7 is very nearly parallel to axis 8 of the rotor, and a second series 9 is very nearly parallel to at least one horizontal edge 10 of the blades. Moreover, the means of protection 4 of the blades can be oriented according to the direction of the wind and are made up of a solid panel that can rotate around the rotor. It is preferable that the panel should be semi-cylindrical, with a semi-circular base in a transverse cross-section, the vertical straight edges of the panel being in a plane passing through the axis 8 of the rotor and parallel to the direction of the wind. The panel also provides a means for cancelling the action of the wind. Moreover, the means for supporting generator 1 are made up of at least three vertical columns 11a, 11b, and 11c, connected by at least one upper circular ring 12 (See FIG. 2), forming, with the columns, a rigid block that stands up to the action of the wind. The device also includes a shock absorber to compensate for gusts.

By referring more particularly to FIGS. 1, 2, and 3, it can be seen that a preferred way of creating the device according to the invention includes a central generator 1 make up of a rotor 2. This rotor 2 is cylindrical, and turns on a central cylindrical axis 8, vertical, solid, with axis X—X. Three blades 3 are integral with rotor 2 and are arranged vertically so as to form 120° angles on the rotor 2. These blades are made up of slightly rounded pieces of sheet metal so as to present a concave active surface. If the direction of the wind is according to arrow $F_1$, blades 3a, 3b, and 3c (See FIG. 1) turn in the direction of arrow $F_2$. Blade 3a of FIG. 1 is subjected to the action of the wind. On the other hand, panel 4, which is semi-cylindrical, is positioned so that its vertical edges 14 and 15, which are straight, form, along with axis X—X, a plane parallel to the direction of the wind and so that it thus prevents blades 3b and 3c, which turn in the direction of arrow $F_2$, from being subjected to the contrary action of the wind moving in the direction indicated by arrow $F_1$. Columns 11a, 11b, and 11c are set up at 120° angles to one another around axis X—X. Moreover, the design can include a lower ring 16 to consolidate the entire device. The blades that are concave have horizontal edges 10 and 10' that are curved and straight lateral edges 17 and 18, parallel to the axis X—X and vertical. Ring 16 constitutes a floor for the entire apparatus.

Each blade has a concave surface 5 bounded by the upper and lower horizontal edges 10 and 10′ and by the lateral edges 17 and 18. This surface, unlike known devices, is not smooth. It constitutes an active surface area, i.e., one that itself harnesses energy, since the wind rushes into cells 6. On the other hand, the inactive face 5′ is smooth and convex (See FIG. 4).

Cells 6 called for by the design on the blade are made up of an initial series of ridges 7, very nearly parallel to one another, and preferably parallel to axis X—X, i.e., vertical. In addition, they are also formed by a second series of ridges 9 parallel to one another and preferably to horizontal edges 10 and 10′. However, the design may allow the first series of ridges 7 and the second series of ridges 9 not to be parallel, respectively, to the axis X—X and to the horizontal edges 10 and 10′. But the series of ridges must constitute cells. These are in the form of polygons (projected onto a plane passing through the axis X—X), the polygons being of arbitrary shape, but having a certain thickness in the direction perpendicular to the surface of the blade. The wind coming onto the surface of the blade on the concave side rushes into the cells and does not slide over the surface area 10 bounded by the edges 10 and 10′ and the edges 17 and 18. Thus, the force of the wind rushing into the cells 6 makes the blades turn much faster than they would if their active surface were smooth. Much more kinetic energy is then harnessed.

Panel 4 masks the blades turning in the direction of arrow $F_2$ and sometimes going against the direction of the wind $F_1$, i.e., up to position P, drawn with a dotted line, in which position the blade is very nearly parallel to the direction $F_1$ of the wind, they are masked by panel 4.

Panel 4 is preferably semi-cylindrical, with axis X—X, and mobile around its axis. Thus, when the direction of the wind changes, for example if the wind turns and coincides with arrow F, panel 4 is made to pivot around axis X—X and occupies a position such that its edge 14 is then in position 14′. Correspondingly, edge 15 comes into position 15′. It can be seen, therefore, that the vertical straight edges 14 and 15 of the panel are always brought into a plane passing through axis X—X of the rotor and parallel to the direction of the wind. Thus, the blades not directly subjected to the action of the wind and advancing in a direction opposite to that of the wind are not slowed by it. It is therefore possible to harness much more wind energy, since the blades, not being slowed by the wind, will be able to turn faster.

According to FIG. 4, it can be seen that columns 11a and 11b, vertical and parallel to axis X—X, include stanchions 19a–19c, sloping with respect to the vertical direction, and horizontal reinforcements 20a and 20b. It is also possible to see blades 3a and 3b, of which the lateral edges 17 and 18 are vertical. Panel 4 includes two semi-circular guiding sections 21 and 21′, very nearly horizontal and with axis X—X. Moreover, columns 11a and 11b each support parts of sections 22a and 22′a and respectively 22b and 22′b, which are also horizontal, circular, with axis X—X, and opposite sections 21 and 21′. Sections 22 and 22′ are U-shaped sections serving as slides for sections 21 and 21′. Thus, panel 4 can turn around axis X—X and also turns on a circular rail 52, raised above the ground. Its orientation can be controlled by any appropriate semi-automatic or automatic means, as a function of the direction of the wind.

If the direction of the wind coincides with arrow $F_1$ (See FIG. 4), it can be seen that columns 11a and 11b and circular ring 12 form a rigid block with respect to the direction of the wind, and that this block can then stand up particularly well to strong gusts of wind. The orientation of panel 4 can be ensured by any appropriate means, as a function of the direction of the wind, in such a way as to mask the blades moving in the direction opposite to that of the wind, but the orientation of panel 4 can also be regulated in such a way that panel 4 masks all the blades against the action of the wind, edges 14 and 15 then moving into positions 14″ and 15″ (See FIG. 1). The convexity of the panel is in this case directed towards the wind, i.e., the panel then forms a screen against the wind. This makes it possible in particular to eliminate the action of the wind on the blades and to stop the device, and allows an operator to perform any needed repairs of the blades.

When the generator turns, the energy is transmitted by means of a cogged ring 23, integral with rotor 2, to a set of gears 24 and 25 that transmits the energy by means of an anti-jolt shock absorber 13 to a utilizer device such as an electric generator 26.

According to the preferred construction pictured in FIG. 4, energy is also transmitted by means of a cogged ring 27 mounted on the base of the blades 3 to a gear 28 integral with shaft 29 of gear 24 of the set of gears 24 and 25. This makes it possible to alleviate the strain placed on rotor 2. The design may also call for rotor 2 to carry along, by means of planet gears mounted on its top, a shaft turning in axis 8 which is hollow in this case, this shaft being connected by gears to the train of gears 24 and 25.

In order for the weight of blades 3 to be supported, the design calls for a ring 30 likewise attached to edge 10′ of blades 3′. This ring 30 is equipped with rollers rolling on a circular rollway 31, supported by columns 51.

Shock absorber 13 includes a cylindrical cover 32, mounted on a bearing that is not shown. This cover is made integral on one side with shaft 33, connected with the windmill, by means of a piece 34 that can slide on shaft 33 and the edges of which are equipped with pins 35 arranged on its circumference and fitting into openings 36 at the end 37 of the cover. Piece 34 is made integral with shaft 33 by means of a pin 50.

Shaft 38, carrying at one end gear 24, enters the cover and is supported there at both ends of the cover by bearings. End 39 is thrust against end 37 of the cover, while horizontal blocking is ensured against end 49 of the cover by stop 40, made integral with shaft 38 by a key. Shaft 38, connected with utilizer device 26, is equipped with two spiral grooves 45, with the same pitch but set off from each other by 180°, on the whole of its length inside cover 32. A cylindrical runner 41 is set up inside cover 32 and integral with the latter in rotation thanks to at least two parts 42 jutting out that can slide freely in the longitudinal grooves 43 cut into the inner wall of the cover.

Runner 41, moreover, includes a central bore 44, of the same diameter as shaft 38 and in which are placed two spiral ribs 46, of the same pitch and set off from each other by 180°, and designed to fit into grooves 45 of shaft 38.

On both sides of the runner, springs 47 and 48 are set up, resting on runner 41 on the one side, and on end 49, in the case of spring 47, and on end 37, in the case of spring 48, on the other side.

The shock absorber operates in the following way:

When piece 35 enters the openings 36 at end 37 with its pins 35, and pin 50 is put into place, the cover is made integral, in terms of rotation, with shaft 33 transmitting the energy coming from the windmill. It begins to turn as soon as shaft 33 is set in rotation, and the runner that turns with it advances in the direction of arrow A by screwing itself onto shaft 45, against the pressure of spring 47. Little by little, when the pressure of the spring becomes stronger, and prevents the runner from going any further, the latter drives shaft 38. After a certain period of time, the system of forces being in equilibrium, the rotation speed of shaft 38 is the same as that of cover 32 and therefore as that of shaft 33.

If a gust of wind comes up, the speed of shaft 33 abruptly increases, and so also does that of the cover. The runner will therefore move forward in the direction of arrow A and gradually make shaft 38 turn at the same speed. If, on the other hand, the wind lets up suddenly, cover 32 will turn more slowly than shaft 38, and the runner will then move in the opposite direction against spring 48 by turning in the other direction with respect to shaft 38. When the forces are in balance, shaft 38 will turn at the same speed as cover 32 and shaft 33. Abrupt variations in speed of rotation are thus absorbed, and the equipment is protected against jolts.

In a simplified version of the shock absorber, spring 47 can be built as a push spring and spring 48 as a pull spring. The course followed by runner 41 inside cover 32 in the direction of arrow A will therefore be longer, and the absorption of gusts of wind will be more gradual.

Of course, the present invention allows numerous variations in its execution, for example, in the number of blades and the size of the cells as a function of the size of the blades, which is not limited.

The windmill is characterized by the framework made up of the columns and the rings—which makes it able to stand up to any test—by the blades, which have cells making it possible to harness a much greater amount of energy than with known devices, and by the shock absorbing apparatus for gusts of wind.

The windmill, according to the invention, can reach a great height, and so it is well to plan on having, in the neighborhood of the upper edge of the blades, one or several rings making the blades integral with one another, to increase their resistance to gusts of wind.

It is likewise advantageous to plan on having, at the base of rotor 2, at least one starter motor, intermeshing, for example, with cogged ring 23, in order to start the rotation of the windmill after a stop, whatever the reason for the stop may be.

On FIG. 7, a symbolic diagram is drawn of a transmission of movement designed to harness energy in the case of blades reaching a very great height. Blades 3 carry on their upper part an inside cogged ring 53 that transmits its movement to axis 54 by means of a set of gears including preferably three planet gears, of which only one, 55, is shown, and a main set of gears 56. At the base of the windmill, axis 54 transmits its movement to shaft 29 by means of a chain drive or gear drive symbolized in 57.

I claim:

1. A device for harnessing energy from wind comprising:

a central generator including a rotor and at least two blades elongated axially in a vertical position, said blades being oriented radially in a horizontal plane and having an active surface area and further including means for harnessing kinetic energy, said active surface area including cells for engulfing air currents;

means for masking said blades when their displacement is in a direction opposite to a direction of said wind;

means for supporting said generator; and shock absorber means comprising;

a first shaft;

rigid cylindrical cover rigidly coupled to set first shaft for transmitting energy to said generator;

said cover having a longitudinal groove on an inside surface thereof;

second shaft having first and second ends, rotatably disposed at said first end inside said cover and coaxially therewith, said second end being coupled to said generator, said shaft further including at least one helical groove thereon, which groove progresses on turning in the direction of rotation of said cover towards said second end;

cylindrical cursor having first and second ends, said cursor being longitudinally slideable in said cover, and having at least one rib, said cursor being coupled to said cover when said cover rotates by said at least one rib which circulates in said longitudinal grooves, said cursor further having a diameter substantially equal to said diameter of said second shaft, said second shaft passing there through and having at least one helical rib in correspondence to said helical groove; and first and second springs located in said cover and coupled between said first and second cursor sides and said first and second ends of said cover respectively.

2. Device according to claim 1, characterised by the fact that the cells (6) are formed by two series of ridges, the first series (7) being parallel to the vertical axe of the rotor and the second series (9) being parallel to the horizontal edge of the blades.

3. The device according to claim 1 further comprising:

an inside cogged ring disposed on an inside outer portion of said blades;

gear set means in engagement with said cogged ring;

axle means coupled to said gear set means for being driven thereby;

gear drive means coupled to said axle means; and shaft means coupled to said gear drive means for being rotatably driven thereby.

* * * * *